July 19, 1960

T. J. FLYNN ET AL 2,945,942

METHOD OF WELDING

Filed July 10, 1958

INVENTORS
Thomas J. Flynn
BY Walter G. Sylvester

Ernest A. Joenen
ATTORNEY

United States Patent Office 2,945,942
Patented July 19, 1960

2,945,942

METHOD OF WELDING

Thomas J. Flynn, Verona, and Walter G. Sylvester, West Caldwell, N.J., assignors to Specialties Development Corporation, Belleville, N.J., a corporation of New Jersey Filed July 10, 1958, Ser. No. 747,757

3 Claims. (Cl. 219—137)

The present invention relates to welding, and, more particularly, to an improved method of electric arc welding abutting ferrous metal members to form a joint therebetween.

The present invention is particularly concerned with forming a butt weld or joint between the edges of iron or steel members which are put together in such a manner that the underside or innerside thereof is not readily accessible to remove excess material at the weld to provide an even surface. This problem is inherent in the construction of containers, adapted to confine fluid medium under pressure, from hemispherical or generally cylindrical members because such containers have relatively small inlet and discharge ports which make it difficult to clean up the weld at the interior. The problem also is present at times when flat plates or members of other shapes are butt welded to provide a seam which is accessible only at one side.

Accordingly, an object of the present invention is to provide a method of making a continuous flawless butt welded joint or seam for iron or steel parts which weld is extremely strong.

Another object is to accomplish the foregoing in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein.

Figure 1:
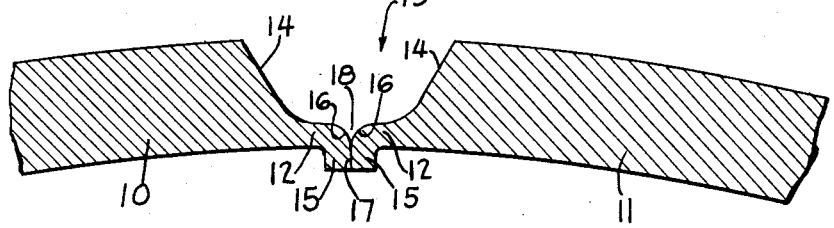
Fig. 1 is a fragmentary sectional view of the edges of two arcuate members placed into position for welding them together.

Referring to Fig. 1 of the drawing in detail, opposed edge portions of two arcuate members 10 and 11 are partially shown which are composed of ferrous metal such as iron or steel. These members could be hemispherical parts for a sphere adapted to be welded at the equator of the sphere or semi-cylindrical parts adapted to be welded together by a longitudinally extending joint or seam.

The members 10 and 11 each have a lower edge portion 12 of reduced thickness which provides an upwardly facing recess portion 14. The portion 12 terminates in a relatively short depending portion or lip 15 which is formed with a chamfer 16, such as a radius or bevel, at its outer upper end and with a flat or straight zone 17 at its lower outer end.

The members 10 and 11 are shown positioned to place the flat zones 17 in abutment with each other to provide a space 18 between the chamfers 16 and a groove 19 between the recess portions 14. The recess portions 14 of the members may be shaped to provide either a U-shaped or a V-shaped groove, and the chamfers 16 may be shaped to provide a V-shaped space 18 having an included angle of between about six and about ten degrees.

Figure 2:
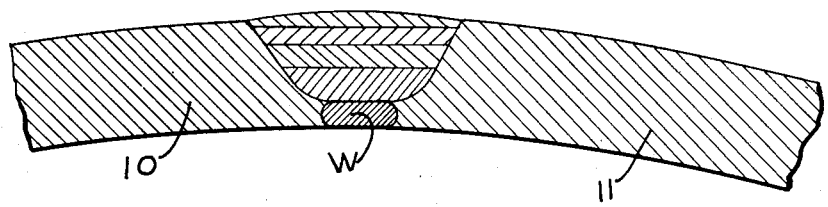
Fig. 2 is a view similar to Fig. 1 illustrating the completion of the weld.

With the members 10 and 11 so positioned, an inert gas shielded electric arc, metal welding electrode was applied thereto at the space 18 between the chamfers for a sufficient duration to fuse and melt the depending portions 15 and form a puddle and to draw the puddle upwardly and thereby provide a continuous weld W (Fig. 2) having a substantially smooth surface at the underside of the members as viewed.

Figure 3:
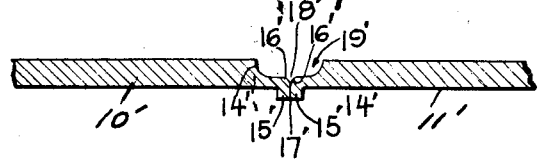
Fig. 3 is a view similar to Fig. 1 illustrating the edges of two flat members placed into position for welding them together.

Molten ferrous filler metal having substantially the same composition and physical properties as the members 10 and 11 was deposited in the groove. Preferably, successive layers of such metal are deposited in the groove and are molten by the arc to fill the groove and to thereby butt weld the members together. Three to five passes are usually required to fill the groove In Fig. 3, the opposed edge portions of two flat members 10' and 11' are shown which are composed of ferrous metal such as iron or steel. These members could be plates or the like adapted to be welded together.

The members 10' and 11' each have a lower edge portion 12' of reduced thickness which provides an upwardly facing recess portion 14'. The portion 12' terminates in a relatively short depending portion or lip 15' which is formed with a chamfer 16' at its outer upper end and with a flat or straight zone 17' at its lower outer end.

The members 10' and 11' are shown positioned to place the flat zones 17' in abutment with each other to provide a space 18' between the chamfer 16' and a groove 19' between the recess portions 14'.

Figure 4:
Fig. 4 is a view similar to Fig. 3 illustrating the completion of the weld.

With the members 10' and 11' so positioned, an inert gas shielded electric arc, metal welding electrode was applied thereto at the space 18 between the chamfers for a sufficient duration to melt the depending portions 15' and form a puddle and to draw the puddle upwardly and threby provide a continuous weld W' (Fig. 4) having a substantially smooth surface at the underside of the members as viewed. The rate at which the electrode is moved depends on the configuration and dimensions of the wall and the edge portions, and in practice is determined visually by the welder.

Molten ferrous fiiller metal having substantially the same composition and physical properties as the members 10' and 11' was deposited in the groove, thereby filling the groove to butt weld the members together. In cases where the groove is relatively shallow, a single layer of filler metal can be utilized to fill the groove.

A specific example of practicing the method in accordance with the present invention comprises fabricating from chrome-moly steel two hemi-spherical shells or halves of a sphere having an outer diameter of about 15.5 inches and a wall thickness of about .290 inch.

The edges of the shells were machined to provide the portions 12, 14 and 15. The recess portions are defined by a wall at an angle of about 30° with respect to the upper surface of the members, and a radius of about .130 between this wall and the chamfer 16. The chamfer has a radius of about .060 inch and merges with the other radius, whereby the portion 12 has a length of about .120 inch measured from the lower edge of the 30° wall to the flat zone 17 and has a thickness of about .060 inch where the two radii merge and has a somewhat greater thickness at the lower edge of the 30° wall. The recess portions thereby have a depth of about .230 inch and a width of about .265 inch. The space 18 between the chamfers has an included angle of about 6°. The portions 15 have widths of about .065 inch and extend from the lower surface of the members about .060 inch.

The shells were held together with the flat zones 17 in abutment as shown in Fig. 1, and, preferably an inert atmosphere is established within the shells by introducing argon, helium or nitrogen at a pressure just above atmospheric pressure. A tungsten electrode of a helium shielded electric arc welding machine was moved along the space 18 in a direction to follow the groove while maintaining the arc at the space. The arc had a temperature of about 8000° to about 10,000° F., and was moved at a rate of about one foot a minute. The arc heated the portions 12 and 15 to form a puddle of molten metal which backed-up to fill the space 18 as the members cool to produce a smooth flush weld at the underside of the members.

A flux shielded wire having the same composition and physical properties as the shells was continuously fed into the groove 19 to form an arc, whereby the wire was molten and fused to the metal of the shells defining the groove. Four more passes were required to fill the groove.

Such a weld was found capable of withstanding a service pressure of 3380 p.s.i., a proof pressure of 5,650 p.s.i., pressure cycling from 0 to 3,000 p.s.i. about 20,000 times, and a burst pressure of 8,200 p.s.i. after cycling.

From the foregoing description, it will be seen that the present invention provides a strong and clean weld in a simple, practical and economical manner.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. The method of electric arc welding together the opposed edges of adjacent wall members composed of ferrous metal each having at its edge a lower portion of reduced thickness providing an upwardly facing recess portion and terminating in a relatively short depending portion formed with a chamfer at its outer upper end and a flat zone at its lower outer end, which method comprises placing the flat zones in abutment with each other to provide a space between the chamfers and a groove between said recess portions, applying an inert gas shielded metal electrode to the members and producing an electric arc at the space between the chamfers for a sufficient duration to melt and puddle the depending portions, moving the electrode in a direction to follow the groove while maintaining the arc at the space whereby as the members cool the puddle is drawn upwardly to provide a substantially smoother continuous surface at the underside of the members at the weld, placing ferrous metal having substantially the same composition and physical properties as the members in the groove, melting the ferrous metal, and filling the groove with molten ferrous metal to butt weld the members together.

2. The method according to claim 1, wherein the recess is filled with successive layers of fused ferrous metal.

3. The method according to claim 1, wherein said recess is filled with a single layer of fused ferrous metal.

References Cited in the file of this patent

UNITED STATES PATENTS

| 1,532,842 | Stresau | Apr. 7, 1925 |
| 1,759,427 | Andren | May 20, 1930 |
| 1,790,738 | Andren | Feb. 3, 1931 |
| 2,288,433 | Boetcher et al. | June 30, 1942 |